United States Patent [19]

Schwab

[11] 4,001,482
[45] Jan. 4, 1977

[54] PREPARATION OF VINYL HALIDE-CONTAINING POLYMERS

[75] Inventor: Peter A. Schwab, Ponca City, Okla.

[73] Assignee: Continental Oil Company, Ponca City, Okla.

[22] Filed: Apr. 30, 1975

[21] Appl. No.: 572,983

[52] U.S. Cl. .............................. 526/73; 526/193; 526/213; 526/344; 526/345

[51] Int. Cl.² ................. C08F 2/18; C08F 2/44; C08F 14/06

[58] Field of Search ............... 260/92.8 W; 526/73, 526/193, 213

[56] References Cited

UNITED STATES PATENTS

| | | | |
|---|---|---|---|
| 2,322,309 | 6/1943 | Morgan et al. | 260/92.8 W |
| 2,985,638 | 5/1961 | Trotter | 260/92.8 W |
| 3,555,122 | 1/1971 | Simons | 260/92.8 W |
| 3,583,956 | 6/1971 | Pointer et al. | 260/92.8 W |

FOREIGN PATENTS OR APPLICATIONS 10,881  6/1961  China /Taiwan ............... 260/92.8

*Primary Examiner*—Alan Holler
*Attorney, Agent, or Firm*—Bayless E. Rutherford, Jr.

[57] ABSTRACT

An improvement in the method of preparing vinyl halide-containing polymers by suspension polymerization is disclosed. Briefly, the improvement comprises "tail-peaking" the reaction mass prior to stripping in order to remove vinyl halide. By "tail-peaking" is meant increasing the temperature of polymerization towards the latter part of the polymerization reaction. In one aspect the improvement comprises the additional feature of conducting the polymerization in the presence of a plasticizer.

12 Claims, No Drawings

PREPARATION OF VINYL HALIDE-CONTAINING POLYMERS

BACKGROUND

The preparation of vinyl halide-containing polymers by suspension polymerization of vinyl halide either alone or in combination with other monomers is well-known. Briefly, the process comprises adding water, the monomer, initiator and suspending agent to the reaction vessel which is jacketed. The reaction mass is heated by injecting steam into the reaction vessel. Once at desired temperature the reaction is maintained at a predetermined temperature by controlling the temperature of the water in the jacket. The reaction is allowed to proceed until it reaches a predetermined conversion level. In some instances the polymerization is terminated by the addition of a material known as a chain-stopping agent. Upon reaching the desired conversion level, the pressure is released by venting usually to a compressor. This pressure release is often called stripping since it reduces the amount of unreacted monomer. The resulting product is a slurry of vinyl halide-containing polymer in water, which contains also unreacted vinyl halide.

More recently, attention has been directed to the problem of preparing polyvinyl halide-containing polymers which contain only a minor amount, if any, of unreacted vinyl halide. My invention is directed to this problem.

PRIOR ART

It is known to add a plasticizer to the initial polymerization recipe in the preparation of vinyl halide-containing polymers by suspension polymerization.

To my knowledge, it is not known to "tail-peak" the reaction mass prior to stripping. Also, the combination of (1) conducting the polymerization in the presence of a plasticizer and (2) "tail-peaking" the reaction mass prior to stripping is not known.

BRIEF SUMMARY OF THE INVENTION

Briefly stated, the present invention is directed to a method of preparing vinyl halide-containing polymers, which contain a reduced amount of unreacted vinyl halide, by an improvement in the suspension polymerization of a monomer selected from the group consisting of a vinyl halide and a mixture of a vinyl halide and a monomer copolymerizable therewith, wherein the improvement comprises polymerizing the monomer to a conversion level of at least about 60 percent, and thereupon increasing the temperature of polymerization by about 14 to about 62° C., with the additional characteristic that the increased polymerization temperature does not exceed 100° C.

In one aspect the improved process contains the additional feature of conducting the polymerization in the presence of a minor amount of plasticizer.

Stated differently, the present invention is directed to a method of preparing vinyl halide-containing polymers, which contain a reduced amount of unreacted vinyl halide, wherein the method comprises:

a. forming a suspension polymerization reaction mixture comprising (i) monomer selected from the group consisting of a vinyl halide and a mixture of a vinyl halide and a monomer copolymerizable therewith, (ii) initiator, (iii) suspending agent and (iv) water, b. polymerizing the monomer to a conversion level of at least about 60 percent, c. thereupon increasing the temperature of polymerization of about 14 to about 62° C., with the additional characteristic that the increased polymerization temperature does not exceed 100° C., and d. stripping the reaction admixture containing the polymer.

The polymer is recovered by conventional means.

In one aspect, the polymerization reaction mixture contains a minor amount of a conventional plasticizer.

DETAILED DESCRIPTION

The vinyl halide used in my invention preferably is vinyl chloride. However, other vinyl halides, such as vinyl bromide and vinyl fluoride, can be used. The invention will be illustrated using vinyl chloride.

My invention is also suitable for use with mixtures of a vinyl halide and a monomer copolymerizable therewith. Examples of monomers which are copolymerizable with vinyl chloride include vinylidene chloride; vinyl acetate; vinyl alkyl esters (such as vinyl neodecanoate); ethylene; propylene; isobutylene; acrylonitrile; ester of acrylic and methacrylic acids such as methyl, ethyl, butyl, propyl, 2-ethylhexyl, hexyl acrylate and methacrylate; esters of maleic acid such as diethyl, dipropyl, dihexyl, and dioctyl maleate.

Any of the initiators ordinarily used in the suspension polymerization of vinyl chloride can be used in my process. Examples of suitable initiators include organic peroxides such as benzoyl peroxide, lauroyl peroxide and diisopropyl peroxydicarbonate; azo compounds such as azobisisobutylronitrile; and the like oil-soluble catalysts.

Also, any of the suspending agents normally used in the suspension polymerization of vinyl chloride can be used in my process. Examples of suitable suspending agents include natural high molecular substances such as starch and gelatin, and synthetic high molecular substances such as partially saponified polyvinyl alcohol, methyl cellulose, ethyl cellulose, hydroxypropoxymethyl cellulose, maleic anhydride-vinyl ether copolymer and polyvinyl pyrrolidine and the like.

Inasmuch as there are many references (patents, books, encyclopedias, etc.) which teach the amounts of water, monomer, initiator and suspending agent, which are used in suspension polymerization processes, it is not believed necessary to describe suitable amounts herein.

Any of the conventional primary or secondary plasticizers, which are conventionally used in the preparation of vinyl polymers, are suitable for use in the process of my invention.

Examples of suitable plasticizers include esters of polycarboxylic acids, such as phthalic acid, isophthalic acid, terephthalic acid, adipic acid, sebacic acid, pimelic acid, azelaic acid, suberic acid 1,4-cyclohexanedicarboxylic acid, naphthalic acid, dinicotinic acid, acridinic acid, and 3,4-quinolinedicarboxylic acid. Also, suitable are phosphoric esters such as trioctyl phosphate, tritolyl phosphate and trixylyl phosphate.

Particularly suitable plasticizers include the $C_2$–$C_{14}$ alkyl esters of dicarboxylic acids. The term dicarboxylic acids as used herein includes both aromatic and aliphatic acids. Examples of particularly suitable plasticizers include dibutyl phthalate, dihexyl phthalate, dioctyl phthalate, di-iso-octyl phthalate, dinonyl phthalate, di-isodecyl-phthalate, ditridecyl phthalate, butyl benzyl phthalate, dibutyl adipate, dihexyl adipate, dioctyl adipate, dibutyl sebacate and dioctyl sebacate.

Of the foregoing materials, the phthalic acid esters are preferred.

Expressed as parts per hundred parts of monomer a suitable amount of plasticizer for use in my invention is about 0.1 to about 10. On the same basis, a preferred amount of plasticizer is about 0.3 to about 5.

PROCESS CONDITIONS

The initial part of the process of my invention is conducted under standard suspension polymerization conditions. Normally, the temperature is in the range of about 38 to about 71° C. More usually, the temperature is in the range of about 49 to about 66° C. As is wellknown in the art the reaction occurs at an increased pressure.

The important feature of the process of my invention is increasing the temperature of polymerization substantially at a predetermined conversion level. The amount of temperature increase is in the range of about 14° to about 62° C., more usually in the range of about 14° to about 33° C., with the additional limitation that the polymerization temperature does not exceed 100° C. The conversion level suitably is at least 60 percent, more suitably at least 70 percent and preferably at least 75 weight percent. A convenient means of determining the desired conversion level is by observing the pressure on the reaction vessel. A drop of pressure in the order 0.7 atmosphere indicates that the conversion has reached a level where the temperature can be increased.

Normally, the temperature increase occurs over a period of about 15 minutes to about five hours.

As indicated hereinbefore the temperature of the polymerization reaction is controlled by the flow of water in the jacket surrounding the reactor.

One convenient means of allowing the desired temperature increase is by utilizing the heat of reaction. In other words, less or no cooling water is used. In some instances, it may be necessary to use external heat to attain the desired temperature.

When the reaction nears completion, the pressure in the reactor begins to drop. At this point and while the reaction admixture is at or near the maximum temperature, stripping is begun. "Stripping" is wellknown to those skilled in this art. Usually, it means venting the vapors, which contain unreacted monomer, to a collecting vessel. The pressure on the reaction vessel is allowed to go to atmospheric. In many instances, the stripping is extended by applying a vacuum to the reactor containing the slurry.

The slurry is then passed to another vessel. If desired, it can be subjected to steam stripping, or other treatment, to remove additional unreacted vinyl halide. It is then processed by conventional means. For example, the water is removed by filtration, after which the polymer is dried.

My process has two distinct advantages. As noted hereinbefore it produces a product having a reduced amount of unreacted vinyl halide. In addition it results in a higher conversion of monomer to polymer. For example, my process results in a conversion of 90 to 92 percent. On the same basis, without tail-peaking, the process normally results in a conversion of 78 to 87 percent.

My process results in a product having a larger amount of low molecular weight material. However, the product is still useful in many applications, such as manufacture of pipe.

In order to disclose the nature of the present invention still more clearly, the following examples will be given. It is to be understood that the invention is not to be limited to the specific conditions or details set forth in these examples except insofar as such limitations are specified in the appended claims.

The amounts of, and nature of, materials used were as follows:

|  | Weight (In Parts) |
| --- | --- |
| Deionized Water | 175 |
| Vinyl Chloride | 100 |
| Suspending Agent[1] | 0.08 |
| Initiator[2] | 0.066 |

[1] Hydroxy propyl methylcellulose
[2] 2-ethylhexyl peroxydicarbonate

EXAMPLE 1

This example shows the improvement obtained using "tail-peaking."

Run A

The materials described in the foregoing were added to a jacketed reaction vessel. After the reaction was begun the temperature was 56° C. with the pressure being 7 atmospheres. When the pressure dropped 0.7 atmosphere (at a conversion level of about 75 percent) the temperature was increased to 79° C. When the pressure dropped to 6.1 atmospheres stripping of the reaction was begun, i.e., the overhead vapors were allowed to escape to a collecting vessel. After the pressure reached 0 atmosphere, a vacuum was pulled on the slurry for 20 minutes while the temperature was 79° C. The water-polyvinyl chloride slurry was cooled and then withdrawn from the reaction vessel and the polyvinyl chloride was recovered by filtering and then dried. The amount of vinyl chloride in the product is shown in Table I.

Run B

The materials were the same as in Run A. The procedure was the same as in Run A with the exception that the temperature was maintained at 56° C. and not increased to 79° C. Stripping was begun while the temperature was 56° C. The amount of vinyl chloride in the product is shown in Table I.

EXAMPLE 2

This example shows the improvement obtained using "tail-peaking" in combination with a small amount of plasticizer.

The plasticizer was dioctyl phthalate. Runs were made using 0.55 and 1.0 parts of dioctyl phthalate per 100 parts of monomer. A comparative run was made. The results are shown in Table I.

Table I

| Run No. | "Tail-peaking" | DOP (phm) | ppm Vinyl Chloride* |
| --- | --- | --- | --- |
| Ex. 1-A | Yes | No | 200 |
| Ex. 1-B | No | No | 1100 |
| Ex. 2-A | Yes | No | 215 |
| Ex. 2-B | Yes | 0.55 | 86 |

Table I-continued

| Run No. | "Tail-peaking" | DOP (phm) | ppm Vinyl Chloride* |
|---|---|---|---|
| Ex. 2-C | Yes | 1.0 | 112 |

*Based on dry resin

EXAMPLE 3

This example also shows the improvement obtained using "tail-peaking."

The materials described in the foregoing were added to a jacketed reactor vessel.

The procedure was similar to that of Run A of Example 1. In Run A of this example, the temperature was raised to 79° C. In Run B, the temperature was raised to 88° C. The amount of vinyl chloride in the products is shown in Table II.

Table II

| | Max. Reactor Temp. ° C. | Temperature Increase ° C. | ppm Vinyl Chloride* |
|---|---|---|---|
| Run A | 79 | 23 | 1200 |
| Run B | 88 | 32 | 400 |

*Based on dry resin

Thus, having described the invention in detail, it will be understood by those skilled in the art that certain variations and modifications may be made without departing from the spirit and scope of the invention as defined herein and in the appended claims.

I claim:

1. A method of preparing vinyl halide-containing polymers, which contain a reduced amount of unreacted vinyl halide, by an improvement in the suspension polymerization of a monomer selected from the group consisting of a vinyl halide and a mixture of a vinyl halide and a monomer copolymerizable therewith, said improvement comprising polymerizing the monomer in the presence, of about 0.1 to about 10 parts, per 100 parts of monomer, of a plasticizer, at a temperature in the range of about 38° to about 71° C., to a conversion level of at least 60 percent, thereupon increasing the temperature about 14° to about 62° C., with the additional characteristic that the increased polymerization temperature does not exceed 100° C.

2. The method of claim 1 wherein the monomer is a vinyl halide.

3. The method of claim 2 wherein the monomer is vinyl chloride.

4. The method of claim 3 wherein the plasticizer is a phosphoric acid ester.

5. The method of claim 3 wherein the plasticizer is $C_2$–$C_{14}$ alkyl ester of phthalic acid.

6. The method of claim 5 wherein the plasticizer is dioctyl phthalate.

7. A method of preparing vinyl halide-containing polymers, which contain a reduced amount of unreacted vinyl halide, said method comprising:
   a. forming a suspension polymerization reaction mixture comprising monomer selected from the group consisting of a vinyl halide and a mixture of a vinyl halide and a monomer copolymerizable therewith, initiator, suspending agent, water, and about 0.1 to about 10 parts per 100 parts of monomer of a plasticizer,
   b. while maintaining the temperature in the range of about 38 to about 71° C. polymerizing the monomer to a conversion level of at least about 60 percent,
   c. thereupon increasing the temperature of polymerization about 14 to about 62° C., with the additional characteristic that the increased polymerization temperature does not exceed 100° C., and
   d. stripping the reaction mixture containing the polymer.

8. The method of claim 7 wherein the monomer is a vinyl halide.

9. The method of claim 8 wherein the monomer is vinyl chloride.

10. The method of claim 9 wherein the plasticizer is a phosphoric acid ester.

11. The method of claim 9 wherein the plasticizer is a $C_2$–$C_{14}$ alkyl ester of phthalic acid.

12. The method of claim 11 wherein the plasticizer is dioctyl phthalate.

* * * * *